United States Patent [19]

Williams et al.

[11] Patent Number: 4,460,755

[45] Date of Patent: Jul. 17, 1984

[54] DIRECT CONVERSION OF A POLYMERIZATION REACTION CATALYZED BY A ZIEGLER-TYPE CATALYST INTO ONE CATALYZED BY A CHROMIUM-BASED CATALYST

[75] Inventors: Gary H. Williams, Somerville; Frederick J. Karol, Belle Mead, both of N.J.

[73] Assignee: Union Carbide Corporation, Danbury, Conn.

[21] Appl. No.: 437,365

[22] Filed: Oct. 28, 1982

Related U.S. Application Data

[63] Continuation-in-part of Ser. No. 429,089, Sep. 30, 1982, abandoned.

[51] Int. Cl.$^3$ .............................................. C08F 2/34
[52] U.S. Cl. ......................................... 526/84; 526/79
[58] Field of Search ................................... 526/79, 84

[56] References Cited

U.S. PATENT DOCUMENTS

| | | |
|---|---|---|
| 2,825,721 | 3/1958 | Hogan et al. ................. 526/106 |
| 3,023,203 | 2/1962 | Dye ............................. 526/68 |
| 3,298,792 | 1/1967 | DiDrusco ..................... 422/143 |
| 3,324,101 | 6/1967 | Baker et al. ................. 526/126 |
| 3,622,521 | 11/1971 | Hogan et al. ............... 252/430 |
| 3,709,853 | 1/1973 | Karapinka .................. 526/130 |
| 4,011,382 | 3/1977 | Levine et al. ............... 526/96 |

*Primary Examiner*—Paul R. Michl
*Assistant Examiner*—Alex H. Walker
*Attorney, Agent, or Firm*—James C. Arvantes; Robert C. Brown; John S. Piscitello

[57] ABSTRACT

A method of converting a continuous olefin polymerization reaction catalyzed by a Ziegler-type catalyst into one catalyzed by a chromium-based catalyst, without the need of emptying and recharging the polymerization reactor, by adding a hydroxyl-containing compound to the reactor containing the Ziegler-type catalyst to interact with such catalyst before the chromium-based catalyst is introduced into the reactor.

17 Claims, 1 Drawing Figure

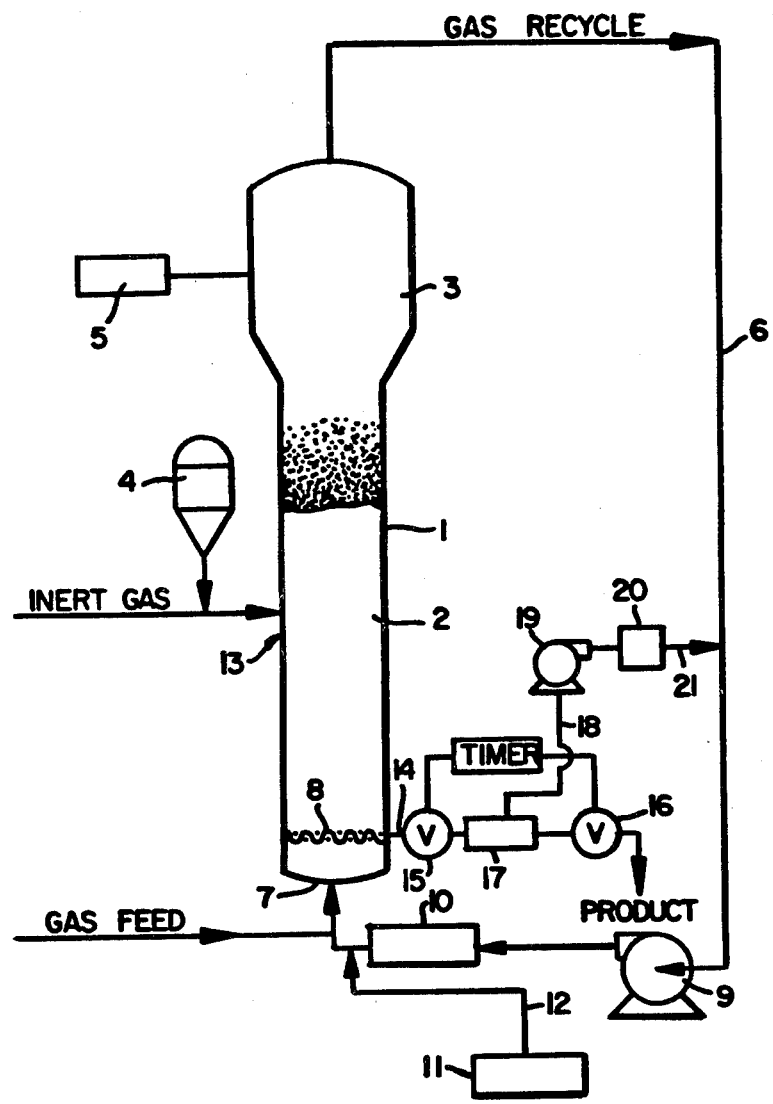

DIRECT CONVERSION OF A POLYMERIZATION REACTION CATALYZED BY A ZIEGLER-TYPE CATALYST INTO ONE CATALYZED BY A CHROMIUM-BASED CATALYST

CROSS-REFERENCE TO RELATED APPLICATIONS

This application is a continuation-in-part of application Ser. No. 429,089, filed Sept. 30, 1982, abandoned.

FIELD OF THE INVENTION

This invention relates to a method of converting a polymerization reaction catalyzed by a Ziegler-type catalyst into one catalyzed by a chromium-based catalyst.

BACKGROUND OF THE INVENTION

From time to time during the production of olefin polymers in a commercial reactor, it is necessary to convert from one type of catalyst system producing polymers having certain properties and characteristics to another catalyst system capable of producing polymers with somewhat different properties and characteristics. When converting from a Ziegler-type catalyst to a chromium-based catalyst, it has been found that the components of the Ziegler-type catalyst act as poisons for the chromium-based catalyst, and that the chromium-based catalyst is ineffective in promoting polymerization if it is introduced directly into the polymerization reactor in the presence of the Ziegler-type catalyst. This is true even if a large excess of the amount of chromium-based catalyst required to promote polymerization is employed.

Since direct conversion from the use of a Ziegler-type catalyst to a chromium-based catalyst has proven unsuccessful, such change of catalyst could heretofore be effected only by halting the polymerization reaction completely, emptying the reactor to rid it of the original catalyst system, and then re-initiating polymerization with the new catalyst system. Furthermore, in order to reinitiate polymerization with the new catalyst, the recharged reactor first had to be purged to low levels of oxygen and water, scavengers had to be employed to remove other catalyst poisons, and prolonged induction periods had to be undergone after such catalyst was introduced into the reactor before polymerization would begin again. Consequently, such catalyst conversions were both time consuming and costly, ordinarily requiring about 4 days or more of reactor shutdown in a commercial operation before polymerzation could once again be re-initiated with the new catalyst.

SUMMARY OF THE INVENTION

In accordance with the present invention it has now been found that a continuous olefin polymerization reaction catalyzed by a Ziegler-type catalyst can be converted directly into one catalyzed by a chromium-based catalyst, without the need of emptying and re-charging the polymerization reactor, and in substantially shorter periods of time than heretofore required, by adding a suitable hydroxyl-containing compound to the reactor containing the Ziegler-type catalyst to interact with such catalyst by physical or chemical means before the chromium-based catalyst is introduced into the reactor.

BRIEF DESCRIPTION OF THE DRAWING

The drawing shows a fluid bed reactor system which can be used to polymerize olefins.

DESCRIPTION OF THE PREFERRED EMBODIMENTS

Conversion from a polymerization catalyzed by a Ziegler-type catalyst to one catalyzed by a chromium-based catalyst is effected by discontinuing the introduction of the Ziegler-type catalyst components into the reactor; preferably permitting polymerization to continue for a time by maintaining polymerization conditions in the reactor in order to allow the catalyst components in the reactor to consume themselves in the production of additional polymer; introducing the hydroxyl-containing compound into the reactor, also under polymerization conditions, and circulating it therein for a time sufficient to react with and/or adsorb the components of the Ziegler catalyst still present in the reactor; and then introducing the chromium-based catalyst into the reactor under polymerization conditions to initiate polymerization with said catalyst. Following the introduction of the chromium-based catalyst, polymerization with said catalyst initiates smoothly within 8 hours, usually within 4 hours.

While the precise role which the hydroxyl compound plays in the direct conversion from a polymerization reaction catalyzed by a Ziegler-type catalyst to one catalyzed by a chromium-based catalyst is unknown, it is believed that this material first reacts with the organometallic activator component of the Ziegler-type catalyst to form an oxygen-metal linkage, and that this reaction product, which is a Lewis acid, in turn reacts with the other components of said catalyst, which are Lewis bases, to form Lewis salts. This in effect results in the bonding of all the components of the Ziegler system to the hydroxyl compound and prevents them from contacting and poisoning the chromium-based catalyst. Some direct reaction between the hydroxyl compound and the various catalyst components other then the organometallic activator compound may also occur in addition to the reactions described above which result in the formation of Lewis acids. In any event, whatever the mechanism, the hydroxyl compound effectively interacts with, either by chemical or physical means, all of the Ziegler catalyst components which ordinarily act as poisons to the chromium-based catalyst, and allows polymerization with the latter catalyst to initiate rapidly and smoothly.

The Ziegler-type catalysts employed to effect polymerization of olefins are, of course, well known in the art. Typically, such catalysts are comprised of (1) a transition metal halide, such as a titanium or vanadium halide, and (2) an organometallic compound of a metal of Groups I to III of the Mendelyveev Periodic Table, typically an alkylaluminum compound, which serves as an activator or co-catalyst for the transition metal halide. The transition metal halide may be supported on a magnesium halide or complexed with a magnesium halide and an electron donor compound to provide added activity. Particularly useful catalysts of the latter type are described in European patent publication No. 004647, which disclosure is incorporated herein by reference. The catalysts described in said European patent publication are made up of (1) a complex precursor composition comprising a titanium halide, magnesium halide and electron donor compound, impregnated in an inert, porous support, and (2) an organoaluminum activator compound. The precursor composition has the formula $$Mg_mTi_1(OR)_nX_p[ED]_q$$

wherein
R is a $C_1$ to $C_{14}$ aliphatic or aromatic hydrocarbon radical, or COR' wherein R' is a $C_1$ to $C_{14}$ aliphatic or aromatic hydrocarbon radical,
X is selected from the group consisting of Cl, Br, I, and mixtures thereof,
ED is a liquid organic electron donor compound in which said precursor composition is soluble and which is selected from the group consisting of alkyl esters of aliphatic and aromatic carboxylic acids, aliphatic ethers, cyclic ethers and aliphatic ketones,
m is 0.5 to 56,
n is 0, 1 or 2,
p is 2 to 116, and
q is 2 to 85,
and the organoaluminum compound has the formula $$Al(R'')_cX'_dH_e$$

wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Any organic or inorganic hydroxyl-containing compound having carbon-hydroxyl linkages or metal-hydroxyl linkages which are capable of reacting with the organometallic component of the Ziegler catalyst present in the reactor, under the conditions of temperature and pressure present in the reactor, to form a Lewis acid, can be employed in the present invention. Such compounds should have a hydroxyl content of from 0.1 mmol/g to 10 mmol/g, preferably from 1.0 mmol/g to 5.0 mmol/g.

The hydroxyl-containing compound employed should also be porous and have a high surface area in order to expose a maximum number of the hydroxyl groups of such compound to contact and interaction with the components of the Ziegler catalyst system. For best results the surface area should exceed 25 square meters per gram, and preferably lies within the range of from 50 square meters per gram to 1000 square meters per gram. Such surface area not only provides maximum reaction with and/or adsorption of the Ziegler components, but also allows a minimum amount of the hydroxyl-containing compound to be used for such interaction with the Ziegler catalyst. To further insure the availability of a maximum number of hydroxyl groups for interaction with the components of the Ziegler catalyst system, the hydroxyl-containing compound should not be dried at high temperatures or otherwise treated in any manner which will result in the removal or inactivation of the hydroxyl groups of such compound. Temperatures of from 100° C. to 250° C. are generally employed for drying to avoid undesirable dehydroxylation reactions.

Since the hydroxyl-containing compound is ultimately present as a contaminant in the polymerization product, it is desirable to employ such material in the form of small particles so that such product will be acceptable for commercial applications. Preferably, such particles have an average particle size of about 10 to about 200 microns.

Among the hydroxyl-containing organic compounds which can be employed are materials such as poly(vinyl alcohol), hydroxyethyl cellulose, and the like Suitable hydroxyl-containing inorganic materials include silica, alumina, thoria, zirconia, and the like. Mixtures of such hydroxyl-containing compounds may, of course, be employed if desired. Preferably, silica is employed as the hydroxyl-containing compound because it is commercially available in a desired particle size and surface area.

Before the hydroxyl-containing compound is added to the reactor containing the Ziegler-type catalyst, the further introduction of all components of the Ziegler catalyst system into the reactor should be discontinued. Polymerization conditions should be maintained following the discontinuance of the further introduction of the Ziegler catalyst components into the reactor, and the polymerization is preferably allowed to continue for a while before the hydroxyl-containing compound is introduced into the reactor in order to allow the catalyst components present in the reactor to consume themselves in the production of additional polymer. Allowing the polymerization reaction to continue in this manner before the hydroxyl-containing compound is introduced into the reactor serves to minimize the amount of such compound required to interact with the Ziegler catalyst components and avoids contaminating the polymer product with large quantities of such compound. However, the polymerization reaction should not be allowed to die completely as this would require allowing polymerization to proceed at a very low rate for an excessive period of time. Preferably, polymerization is allowed to slow to about 10 percent to 30 percent of the rate employed at the time the introduction of the Ziegler catalyst components into the reactor is discontinued. It has been found that from about 1 hour to about 10 hours are generally required to bring about a suitable slowing of reaction, most usually from 1 to 4 hours.

After polymerization has slowed to the desired rate, the hydroxyl-containing compound is introduced into the reactor while continuing to maintain polymerization conditions. In order to bring the hydroxyl-containing compound into contact with the components of the Ziegler catalyst system to allow the hydroxyl-containing compound to react with and/or adsorb such components, appropriate circulation means must be maintained in the reactor. When solution or slurry polymerizations are employed, stirring or agitation can be employed. When polymerization is conducted in a fluid bed, as is preferred, the gas flow employed to fluidize the bed acts also to circulate the hydroxyl-containing compound throughout the reactor. Circulation should be continued, of course, for a time sufficient to allow the hydroxyl-containing compound to react with and/or adsorb the components of the Ziegler catalyst still present in the reactor. The time required for this purpose will, of course, depend upon the particular hydroxyl-containing compound employed and the amount of such compound that is introduced into the reactor. Normally, from 1 to 12 hours are required, most usually from 2 to 4 hours.

The hydroxyl-containing compound should be employed in an amount sufficient to react with and/or adsorb all the components of the Ziegler catalyst system present in the reactor. Since the precise amount of unconsumed catalyst components present in the reactor is unknown, an excess of the stiochiometric amount required for this purpose should be employed to ensure complete removal of all unconsumed components of such catalyst. However, since the hydroxyl-containing compound ultimately appears as a contaminant in the polymer product, it is undesirable to add too large an excess. As a practical matter, from 150 percent to 600 percent, preferably from 200 percent to 400 percent, of the stoichiometric amount required to react with at least one organic group of each organometallic molecule of the organometallic component of the Ziegler catalyst system should be employed. From a knowledge of the amount of organometallic compound added to the reactor and the amount of polymer produced, it is possible to estimate the amount of organometallic component still present in the reactor. The amount of hydroxyl-containing compound to be added can in turn be related to the amount of organometallic component estimated to be in the reactor. As a practical matter, it has been found that from 0.7 kg to 2.6 kg of hydroxyl-containing compound should be added for each mol of organometallic component remaining in the reactor, preferably from 0.8 kg to 1.3 kg of hydroxyl-containing compound per mol of organometallic component remaining in the reactor. When silica is employed as the hydroxyl-containing compound, it is preferred to employ from 0.8 kg. to 1.3 kg per mol of organometallic component remaining in the reactor.

Following addition of the hydroxyl-containing compound to the reactor, polymerization continues to decrease as this material reacts with and/or absorbs the components of the Ziegler catalyst still present in the reactor. As aforementioned, the hydroxyl-containing compound normally should be circulated in the reactor for from 1 to 12 hours, most usually for from 2 to 4 hours, before the chromium-based catalyst is introduced into the reactor to ensure complete reaction with and/or adsorption of all the Ziegler catalyst components. During this time, polymerization conditions in the reactor may be adjusted from those employed for the Ziegler catalyzed polymerization to those employed with the chromium-based catalyst. Such conditions include, inter alia, temperature, pressure, monomer composition and monomer concentration.

Generally, temperatures of from 300° C. to 115° C. and pressures of from 70 kPa to 7000 kPa may be employed for both Ziegler catalyzed polymerizations and those catalyzed with chromium-based catalysts. The monomer composition and monomer concentration employed will, of course, depend upon the desired polymer composition and properties. Both type catalysts are ordinarily employed to homopolymerize ethylene or copolymerize ethylene with at least one other alpha-olefin containing from 3 to 8 carbon atoms. Among such other alpha-olefins are propylene, butene-1, pentene-1, hexene-1 and octene-1. Preferably, such alpha-olefins are employed in an amount sufficient to achieve a concentration of from 1.0 to 15 mol percent in the copolymer.

After the hydroxyl-containing compound has been circulated in the reactor for a time sufficient to completely react with and/or adsorb all the Ziegler catalyst components, and the reactor conditions have been adjusted to those to be employed with the chromium-based catalyst, the chromium-based catalyst is introduced into the reactor. Usually, such catalyst is introduced into the reactor at a rate of from about 25 percent to about 100 percent of the rate normally employed during polymerization, preferably at a rate of from about 30 percent to about 100 percent of the rate normally employed during polymerization. Polymerization with said catalyst ordinarily initiates in from 1 hour to 8 hours after it has been introduced into the reactor, most usually in from 1 hour to 4 hours after it has been introduced into the reactor.

After polymerization with the chromium-based catalyst has been initiated, it is necessary to maintain a catalytically effective amount of said catalyst in the reactor to maintain reaction. During polymerization, the reactor should be maintained free of excessive amounts of undesirable catalyst poisons such as moisture, oxygen, carbon monoxide and acetylene. Occasionally however, very small amounts of such materials may be added to influence polymer properties.

The properties and characteristics of the initial product that is withdrawn from the reactor will, of course, differ from the desired polymer properties and characteristics due to the presence of Ziegler catalyzed polymer in the reactor. In order to obtain polymers with the desired properties and characteristics polymerization must be continued for a time sufficient to provide at least 1 to 4 reactor turnovers (i.e., at least the equivalent of 1 to 4 times the volume of polymer in the reactor must be removed from the reactor following the initiation of polymerization with the chromium-based catalyst before polymers having the desired properties and characteristics can be obtained).

The process can be employed to convert a polymerization reaction catalyzed by a Ziegler-type catalyst system into one catalyzed by any chromium-based catalyst. Characteristically, such chromium-based catalysts are supported on an inorganic carrier. Among the chromium-based catalysts which can be employed are the silyl chromate catalysts described in U.S. Pat. No. 3,324,101, as well as the bis(cyclopentadienyl)-chromium catalysts described in U.S. Pat. No. 3,709,853. Most preferably, however, the chromium oxide catalysts described in U.S. Pat. Nos. 2,825,721 and 3,023,203 are employed. The titanated chromium oxide catalysts disclosed in U.S. Pat. No. 3,622,521 can also be employed, as well as the fluorided and titanated chromium oxide catalysts described in U.S. Pat. No. 4,011,382.

The preferred chromium oxide catalysts can be prepared by depositing a suitable chromium compound, preferably along with a titanium compound, or most preferably both a titanium compound and a fluorine compound, on a dried support, and then activating the resulting composite composition by heating it in air or oxygen at a temperature of from about 300° C. to about 900° C., preferably from about 700° C. to about 850° C., for at least two hours, preferably from about 5 hours to about 15 hours. The chromium compound, titanium compound and fluorine compound are deposited on the support in such quantities as to provide, after the activation step, the desired levels of chromium, titanium and fluorine in the catalyst.

The order of addition of the chromium compound, titanium compound and fluorine compound to the support is not critical, provided that all these compounds are added before the composite catalyst is activated, and the support is dried before the titanium compound is added thereto.

After activation, the supported catalyst should contain, based on the combined weight of the support and the chromium, titanium and fluorine materials present therein, about 0.005 to about 3.0, and preferably about 0.1 to about 1.0, weight percent of chromium (calculated as Cr), 0 to about 9.0, and preferably about 3.0 to about 7.0, weight percent of titanium (calculated as Ti), and 0.0 to about 2.5, and preferably about 0.1 to about 1.0, weight percent of fluorine (calculated as F).

The chromium compounds which may be used include $CrO_3$, or any compound of chromium which is ignitable to $CrO_3$ under the activation conditions employed. Chromium compounds other than $CrO_3$ which may be used are disclosed in U.S. Pat. Nos. 2,825,721 and 3,622,521 (the disclosures of which patents are hereby incorporated by reference) and include chromic acetyl acetonate, chromic nitrate, chromic acetate, chromic chloride, chromic sulfate, and ammonium chromate.

Water soluble compounds of chromium, such as $CrO_3$, are the preferred compounds for use in depositing the chromium compound on the support from a solution of the compound. Organic solvent soluble chromium compounds may also be used.

The titanium compounds which may be used include all those which are ignitable to $TiO_2$ under the activation conditions employed, especially those disclosed in U.S. Pat. Nos. 3,622,521 and 4,011,382 (the disclosures of which patents are hereby incorporated by reference). These compounds include those having the structures $$(R')_n Ti(OR')_m$$

$$(RO)_m Ti(OR')_n \text{ and}$$

$$TiX_4$$

where m is 1, 2, 3 or 4; n is 0, 1, 2 or 3; and m+n=4;
R is a $C_1$ to $C_{12}$ alkyl, aryl or cycloalkyl group, and combinations thereof, such as aralkyl, alkaryl, and the like;
R' is R, cyclopentadienyl, and $C_2$ to $C_{12}$ alkenyl groups, such as ethenyl, propenyl, isopropenyl, butenyl and the like; and
X is chlor.ine, bromine, fluorine or iodine.

The titanium compounds would thus include titanium tetrachloride, titanium tetraisopropoxide and titanium tetrabutoxide. The titanium compounds are conveniently deposited on the support from a hydrocarbon solvent solution thereof.

The titanium (as Ti) is present in the catalyst, with respect to the Cr (as Cr), in a mol ration of about 0 to 180, and preferably of about 4 to 35.

The fluorine compounds which may be used include HF, or any compound of fluorine which will yield HF under the activation conditions employed. Fluorine compounds other than HF which may be used are disclosed in U.S. Pat. No. 4,011,382. These compounds include ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The support employed for the catalyst are porous, inorganic oxide materials having a high surface area, that is, a surface area in the range of about 50 to about 1000 square meters per gram, and an average particle size of about 10 to 200 microns. The inorganic oxides which may be used include silica, alumina, thoria, zirconia and other comparable inorganic oxides, as well as mixtures of such oxides.

Any grade of support can be used but microspheroidal intermediate density silica having a surface area of 300 square meters per gram, a pore diameter of about 200 Å, and an average particle size of about 70 microns is preferred (e.g., Grade 952 MS 1D silica available from Davison Chemical Division, W. R. Grace and Company.)

The catalyst support, which may have the chromium and/or fluorine compound deposited thereon, should be dried before it is brought into contact with the titanium compound. This is normally done by simply heating or pre-drying the catalyst support with a dry inert gas or dry air prior to use. It has been found that the temperature of drying affects the molecular weight distribution and melt index of the polymer produced. The preferred drying temperature is 100° C. to 300° C.

Activation of the supported catalyst can be accomplished at nearly any temperature up to about its sintering temperature. The passage of a stream of dry air or oxygen through the supported catalyst during the activation aids in the displacement of the water from the support. Activation temperatures of from about 300° C. to about 900° C. for a period of about six hours or so should be sufficient if well dried air or oxygen is used, and the temperature is not permitted to get so high as to cause sintering of the support.

Normally, the activated catalyst component is employed in the reactor in an amount of from about 0.005 weight percent to about 0.2 weight percent of the weight of polymer produced.

While transformation of a polymerization reaction catalyzed by a Ziegler type catalyst into one catalyzed by a chromium-based catalyst can be effected in either gas phase, slurry or solution polymerizations, it is preferably effected in a fluid bed reaction system.

A fluidized bed reaction system which can be used to polymerize olefins is illustrated in the drawing. With reference thereto the reactor 1 consists of a reaction zone 2 and a velocity reduction zone 3.

The reaction zone 2 comprises a bed of growing polymer particles, formed polymer particles, and a minor amount of catalyst particles fluidized by the continuous flow of polymerizable and modifying gaseous components in the form of make-up feed and recycle gas through the reaction zone. To maintain a viable fluidized bed, the superficial gas velocity through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

It is essential that the bed always contains particles to prevent the formation of localized "hot spots" and to entrap and distribute the particulate catalyst throughout the reaction zone.

Fluidization is achieved by a high rate of gas recycle to and through the bed, typically on the order of about 50 times the rate of feed of make-up gas. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady gaseous composition within the reaction zone.

To insure complete fluidization, the recycle gas and, where desired, part of the make-up gas are returned over gas recycle line 6 to the reactor at point 7 below the bed. At this point there is a gas distribution plate 8 above the point of return to aid in fluidizing the bed.

The portion of the gas stream which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growi.ng and formed particulate polymer particles, as well as catalyst particles. As the polymer particles are hot and possible active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. No. 3,298,792. Whatever its design, it must diffuse the recyle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction in amounts varying between about 0.001 to about 10 moles of hydrogen per mole of olefin in the gas stream.

Any gas inert to the catalyst and reactants can also be present in the gas stream. The hydroxyl-containing compound is introduced into the reaction system from dispenser 11 through line 12 which flows into the gas recycle line of such system. The hydroxyl-containing compound is stored in the dispenser under an inert gas blanket.

It is necessary to operate the fluid bed reactor at a temperature below the sintering temperature of the polymer particles to insure that sintering does not occur. While temperatues of from 30° C. to 115° C. are suitable, temperatures of about 75° C. to about 115° C. are preferred, and temperatures of about 80° C. to about 110° C. are most preferred.

The fluid bed reactor may be operated at pressures of up to about 7000 kPa, but is preferably operated at pressures of from about 70 kPa to 2500 kPa, with operation at the higher pressures in such ranges favoring heat transfer since an increase in pressure increases the unit volume heat capacity of the gas.

The catalyst employed in the fluidized bed is preferably stored for service in reservoir 4 under an inert gas blanket and is introduced into the reactor at a rate equal to its consumption at a point 13 which is above the distribution plate 8. An inert gas can be used to carry the catalyst into the bed. Preferably, the catalyst is injected at a point in the bed where good mixing of polymer particles occurs. Injection into the viable bed aids in distributing the catalyst throughout the bed and tends to preclude the formation of localized spots of high catalyst concentration which may result in the formation of "hot spots".

If an activator component of the catalyst is required, as in Ziegler-type polymerizations, such activator component is preferably added to the reaction system downstream from heat exchanger 10. Thus, the activator component may be fed into the gas recycle system through line 12 from a dispenser, not shown.

The production rate of the reactor is controlled by the rate of catalyst injection. The production rate may be increased by simply increasing the rate of catalyst injection and decreased by reduc:ng the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continually withdrawn at a point 14 at or close to the distribution plate 8 in suspension with a portion of the gas stream which is vented before the particles settle to minimize further polymerization and sintering when the particles reach their ultimate collection zone.

The particulate polymer product is conveniently and preferably withdrawn through the sequential operation of a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to wait the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor is equipped with an adequate venting system to allow venting the bed during start-up and shutdown. The reactor does not require the use of stirring means and/or wall scraping means.

The feed stream of gaseous monomer(s) polymerizes at a space time yield of about 2 to 10 pounds/hour/cubic foot of bed volume.

The following Examples are designed to illustrate the process of the present invention and are not intended as a limitation upon the scope thereof.

EXAMPLE 1

Preparation of Precursor Component of Ziegler-Type Catalyst

In a 12 liter flask equipped with a mechanical stirrer were placed 41.8 g (0.439 mol) anhydrous $MgCl_2$ and 2.5 liters tetrahydrofuran (THF). To this mixture, 27.7 g (0.146 mol) $TiCl_4$ were added dropwise over $\frac{1}{2}$ hour. The mixture was heated at 60° C. for about $\frac{1}{2}$ hour in order to completely dissolve the material.

Five hundred grams (500 g) of silica was dehydrated by heating at a temperature of 600° C. and slurried in 3 liters of isopentane. The slurry was stirred while 186 ml. of a 20 percent by weight solution of triethylaluminum in hexane was added thereto over a $\frac{1}{4}$ hour period. The mixture was dried under a nitrogen purge at 60° C. for about 4 hours to provide a dry, free flowing powder containing 5.5 percent by weight of the aluminum alkyl.

The treated silica was then added to the solution prepared as above and stirred for $\frac{1}{4}$ hour. The mixture was dried under a nitrogen purge at 60° C. for about 4 hours to provide a dry, impregnated, free flowing powder having the particle size of the silica.

The silica-impregnated precursor composition prepared in this manner was then slurried in 3 liters of anhydrous isopentane and stirred while a 20 percent by weight solution of tri-n-hexylaluminum in anhydrous hexane was added thereto over a $\frac{1}{4}$ hour period. The tri-n-hexylaluminum solution was employed in an amount sufficient to provide 0.8 mol of aluminum per mol of tetrahydrofuran in the precursor. After addition of the tri-n-hexylaluminum was completed, stirring was continued for an additional $\frac{1}{4}$ hour. The mixture was then dried under a nitrogen purge at a temperature of 65°±10° C. over a period of about 4 hours to provide a dry, free-flowing powder. This material was stored under dry nitrogen until it was needed.

EXAMPLE 2

Preparation of Chromium Oxide Catalyst

One hundred grams (100 g) of a commercial silica impregnated with chromic acetate to a concentration of 1 weight percent chromium (Grade 969 MSB silica obtained from Davison Chemical Division, W. R. Grace and Company) was admixed with 400 grams of a commercial unimpregnated silica (Grade 952 MS ID silica obtained from Davison Chemical Division, W. R. Grace and Company). The silica mixture was then dried by heating under a stream of nitrogen for about four hours at 200° C.

About 400 grams of the dried silica mixture was slurried in about 2000 ml of dry isopentane, and 140 grams of titanium tetraisopropoxide was added to the slurry. The system was thoroughly mixed and then heated to remove the isopentane.

The dried product was then transferred to an activator (heating vessel) and admixed with 4 grams of $(NH_4)_2SiF_6$. The mixture was then heated under nitrogen at a temperature of 150° C. for one hour, and then at 300° C. for an additional hour, to insure that all the isopentane was removed and to slowly remove organic residues from the titanium tetraisopropoxide so as to avoid any danger of a fire. The nitrogen stream was then replaced with a stream of dry air and the mixture was heated at 300° C. for about two hours and then at 825° C. for about eight hours to produce an activated catalyst composition. The activated catalyst was then cooled with dry air (at ambient temperature) to about 150° C., and then to room temperature with nitrogen (at ambient temperature).

After activation, the catalyst contained 0.20 percent by weight chromium, 3.74 percent by weight titanium, and 0.15 percent by weight fluorine.

EXAMPLE 3

Conversion of Ziegler Catalyzed Polymerization into Chromium Oxide Catalyzed Polymerization Conversion of a copolymerization reaction of ethylene and butene-1 employing a Ziegler-type catalyst into one catalyzed by a chromium oxide catalyst was effected in a fluid bed reaction system such as the one illustrated in the drawing and described above.

The Ziegler catalyst system employed in the polymerization consisted of a silica-supported precursor component and an activator component. The supported precursor component was prepared and partially activated with tri-n-hexylaluminum as described in Example 1. Activation of the precursor component was completed in the reactor by continuously feeding the precursor component into the reactor along with a 5 percent by weight solution of triethylaluminum in isopentane. The precursor component and the triethylaluminum solution were fed to the reactor at rates such that the completely activated precursor had an aluminum/titanium molar ratio of 60:1.

Polymerization with the Ziegler catalyst was effected at a pressure of 2100 kPa and a temperature of 97° C. Ethylene, butene-1 and hydrogen were introduced into the reactor at a rate sufficient to maintain a butene-1/ethylene molar ratio of 0.26:1 and a hydrogen/ethylene molar ratio of 0.27:1. A superficial gas velocity of 1.5 feet/second was employed.

In order to slow the Ziegler catalyzed polymerization and begin conversion to a chromium oxide polymerization, the flow of Ziegler catalyst components into the reactor was discontinued. The feed of the precursor component was interrupted first, and the feed of the activator component was discontinued 2 hours later. All other conditions, such as temperature, pressure, monomer concentration, and the like, were maintained following discontinuance of the catalyst feed. Within 7.5 hours from the time the feed of the precursor component was discontinued, polymerization slowed from a production rate of 3600 kg of copolymer per hour to 250 kg of copolymer per hour.

At the end of this time, 36.3 kg of silica (Grade 952 MS ID silica obtained from Davison Chemical Division, W. R. Grace and Company) were introduced into the reactor and circulated throughout the reaction system by means of the gas flow employed to fluidize the bed. The amount of silica employed was equivalent to 1.2 kg per mol of unconsumed triethylaluminum estimated to be in the reactor. Prior to introducing the silica into the reactor it was dried at 200° C. for 4 hours.

Circulation of silica in the reactor was continued for 4.5 hours. During this time polymerization conditions were maintained as they were during the Ziegler catalyzed polymerization except that the flow of hydrogen to the reactor was increased, the flow of butene-1 was decreased, and the temperature was lowered to 88° C. The flow of hydrogen was increased to provide a hydrogen/ethylene molar ratio of 0.3:1 in order to prevent the melt index of the polymer which was still being produced from dropping. The molar ratio of butene-1/ethylene, on the other hand, was permitted to drop to 0.08:1, and the temperature was lowered, to adjust the reactor conditions to those to be employed with the new catalyst.

The chromium oxide catalyst prepared as described in Example 2 was then introduced into the reactor at a rate of about 200 g per hour. The reactor conditions described in the Ziegler catalyzed polymerization were maintained except for the adjustments described above. The polymerization rate increased smoothly within 2 hours after the catalyst was introduced into the reactor. At this time, the catalyst feed was gradually increased over a 5 hour period to a rate of 500 g per hour. Six hours after the catalyst was first introduced into the reactor, polymer production reached a rate of 1816 kg per hour. Within 10 hours from the time the catalyst had first been introduced into the reactor, a production rate of 3200 kg of copolymer per hour was attained.

We claim:

1. A process for converting a continuous olefin polymerization reaction catalyzed by a Ziegler-type catalyst comprises of (1) a transition metal halide, and (2) an organometallic compound of a metal of Groups I to III of the Mendelyveev Periodic Table, into one catalyzed by a chromium-based catalyst which comprises
   (a) discontinuing the introduction of the components of the Ziegler catalyst system into the polymerization reactor;
   (b) maintaining polymerization conditions in the reactor and permitting polymerization to continue for a time in order to allow the components of the Ziegler catalyst system present in the reactor to consume themselves in the production of additional polymer;
   (c) introducing a hydroxyl-containing compound into the reactor, said hydroxyl-containing compound having carbon-hydroxyl or metal-hydroxyl linkages which are capable of reacting with the organometallic component of the Ziegler catalyst system to form a Lewis acid, and circulating said hydroxyl-containing compound in the reactor, while continuing to maintain polymerization conditions, for a time sufficient to allow said hydroxyl-containing compound to interact with the components of the Ziegler catalyst system; and then
   (d) introducing a chromium-based catalyst into the reactor under polymerization conditions suitable for said catalyst at a rate of from 25 percent to 100 percent of the rate employed during polymerization to maintain a catalytically effective amount of such catalyst in the reactor, and maintaining said conditions until polymerization with said catalyst has initiated.

2. A process as in claim 1 wherein the chromium-based catalyst is a chromium oxide catalyst.

3. A process as in claim 2 wherein the hydroxyl-containing compound has a hydroxyl content of from 0.1 mmol/g to 10 mmol/g.

4. A process as in claim 3 wherein the hydroxyl-containing compound has a surface area of from 50 square meters per gram to 1000 square meters per gram, and an average particle size of from 10 microns to 200 microns.

5. A process as in claim 2, 3 or 4 wherein the hydroxyl-containing compound is silica.

6. A process as in claim 2, 3 or 4 wherein polymerization is conducted in a fluid bed reactor.

7. A process as in claim 6 wherein the hydroxyl-containing compound is silica.

8. A process as in claim 6 wherein from 0.7 kg to 2.6 kg of the hydroxyl-containing compound is added to the reactor per mol of organometallic component of the Ziegler catalyst system present in the reactor.

9. A process as in claim 8 wherein the hydroxyl-containing compound is silica.

10. A process as in claim 8 wherein polymerization in the reactor is allowed to continue for from 1 hour to 10 hours after the introduction of the components of the Ziegler catalyst system has been discontinued and before the hydroxyl-containing compound has been introduced into the reactor, and the hydroxyl-containing compound is circulated in the reactor for from 1 hour to 12 hours before the chromium-based catalyst is introduced into the reactor.

11. A process as in claim 10 wherein the hydroxyl-containing compound is silica.

12. A process as in claim 6 wherein the Ziegler-type catalyst comprises a precursor component impregnated in an inert, porous support and an organoaluminum activator component, said precursor component having the formula

wherein
R is a $C_1$ to $C_{14}$ aliphatic or aromatic hydrocarbon radical, or $COR'$ wherein $R'$ is a $C_1$ to $C_{14}$ aliphatic or aromatic hydrocarbon radical,
X is selected from the group consisting of Cl, Br, I, and mixtures thereof,
ED is a liquid organic electron donor compound in which said precursor component is soluble and which is selected from the group consisting of alkyl esters of aliphatic and aromatic carboxylic acids, aliphatic ethers, cyclic ethers and aliphatic ketones,
m is 0.5 to 56,
n is 0, 1 or 2,
p is 2 to 116, and
q is 2 to 85,
and the organoaluminum activator component has the formula

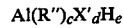

wherein $X'$ is Cl or $OR'''$, $R''$ and $R'''$ are the same or different and are $C_1$ and $C_{14}$ saturated hydrocarbon radicals, d is 0 to 1.5, e is 1 or 0 and $c+d+e=3$.

13. A process as in claim 12 wherein the hydroxyl-containing compound is silica.

14. A process as in claim 12 wherein from 0.8 kg to 1.3 kg of the hydroxyl-containing compound is added to the reactor per mole of organoaluminum activator component of the Ziegler catalyst system present in the reactor.

15. A process as in claim 14 wherein the hydroxyl-containing compound is silica.

16. A process as in claim 14 wherein polymerization in the reactor is allowed to continue for from 1 hour to 4 hours after the introduction of the components of the Ziegler catalyst system has been discontinued and before the hydroxyl-containing compound has been introduced into the reactor, and the hydroxyl-containing compound is circulated in the reactor for from 2 hours to 4 hours before the chromium-based catalyst is introduced into the reactor.

17. A process as in claim 16 wherein the hydroxyl-containing compound is silica.

* * * * *